US009291474B2

(12) United States Patent
Basson et al.

(10) Patent No.: US 9,291,474 B2
(45) Date of Patent: Mar. 22, 2016

(54) SYSTEM AND METHOD FOR PROVIDING GLOBAL POSITIONING SYSTEM (GPS) FEEDBACK TO A USER

(71) Applicant: International Business Machines Corporation, Armonk, NY (US)

(72) Inventors: Sara H. Basson, White Plains, NY (US); Sachin Gupta, New Delhi (IN); Dimitri Kanevsky, Ossining, NY (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 13/970,158

(22) Filed: Aug. 19, 2013

(65) Prior Publication Data
US 2015/0051826 A1 Feb. 19, 2015

(51) Int. Cl.
*G01C 21/36* (2006.01)
(52) U.S. Cl.
CPC .................................. *G01C 21/3697* (2013.01)
(58) Field of Classification Search
CPC ........... G01C 21/3658; G01C 21/3697; G01C 21/20; G09B 23/28; G09B 19/00
USPC ......... 701/437, 425, 420, 532, 527, 117, 410, 701/431, 439, 516, 517, 443; 600/521, 300, 600/509; 434/236; 340/995.2, 910, 988, 340/990
See application file for complete search history.

(56) References Cited

U.S. PATENT DOCUMENTS

| | | | |
|---|---|---|---|
| 5,177,685 A | 1/1993 | Davis et al. | |
| 6,347,280 B1 * | 2/2002 | Inoue et al. | 701/443 |
| 6,349,257 B1 | 2/2002 | Liu et al. | |
| 7,660,667 B2 * | 2/2010 | Furukawa | 701/420 |
| 8,022,831 B1 | 9/2011 | Wood-Eyre | |
| 8,676,506 B1 * | 3/2014 | LaLiberte | 701/527 |
| 8,725,311 B1 * | 5/2014 | Breed | G08B 21/06 600/300 |
| 2003/0097047 A1 * | 5/2003 | Woltermann et al. | 600/300 |
| 2006/0293838 A1 * | 12/2006 | Yamamoto et al. | 701/200 |
| 2007/0271034 A1 | 11/2007 | Perry | |
| 2008/0215237 A1 | 9/2008 | Perry | |
| 2009/0088965 A1 | 4/2009 | Burckart et al. | |
| 2009/0092284 A1 * | 4/2009 | Breed | B60J 10/00 382/103 |
| 2009/0125229 A1 * | 5/2009 | Peri et al. | 701/201 |
| 2009/0192705 A1 | 7/2009 | Golding et al. | |

(Continued)

OTHER PUBLICATIONS

IBM, "Method of Incorporating Context-Based User Feedback into Global Positioning System Navigation System," IPCOM000172112D, Jun. 2008, 2 pages.

(Continued)

*Primary Examiner* — Marthe Marc-Coleman
(74) *Attorney, Agent, or Firm* — Louis J Percello; Ryan, Mason & Lewis, LLP

(57) ABSTRACT

Systems and methods for providing global positioning system (GPS) feedback to a user are provided. A method for providing global positioning system (GPS) feedback to a user, comprises evaluating a route of the user to determine potential points of confusion, collecting at least one of behavioral information and physiological information from the user, analyzing the collected information to determine a level of user confusion at a point on the route and whether the level of the user confusion exceeds a threshold, and providing the user with clarifying feedback upon at least one of a determination of a potential point of confusion and the level of the user confusion exceeding the threshold.

21 Claims, 3 Drawing Sheets

(56) References Cited

U.S. PATENT DOCUMENTS

| | | | |
|---|---|---|---|
| 2010/0009326 A1* | 1/2010 | Mori | 434/236 |
| 2010/0250126 A1* | 9/2010 | Epshtein et al. | 701/209 |
| 2011/0208417 A1 | 8/2011 | Fink et al. | |
| 2011/0301433 A1 | 12/2011 | Sadowsky et al. | |
| 2011/0307188 A1 | 12/2011 | Peng et al. | |
| 2012/0035825 A1* | 2/2012 | Morita | B60T 7/22 701/70 |
| 2012/0150430 A1* | 6/2012 | French et al. | 701/425 |
| 2012/0191343 A1 | 7/2012 | Haleem | |
| 2012/0330173 A1* | 12/2012 | Park et al. | 600/521 |
| 2013/0009761 A1* | 1/2013 | Horseman | B60W 40/08 340/425.5 |
| 2013/0158864 A1* | 6/2013 | Kim et al. | 701/428 |
| 2013/0179024 A1* | 7/2013 | Nordbruch | A61B 5/18 701/23 |
| 2014/0099623 A1* | 4/2014 | Amit et al. | 434/350 |
| 2014/0188388 A1* | 7/2014 | Malahy et al. | 701/533 |

OTHER PUBLICATIONS

John of Austin, "GPS Software Built on Crowdsourcing," Daily Crowdsource, http://dailycrowdsource.com/20-resources/projects/244-gps-software-built-on-crowdsourcing, 3 pages.

Urban Cybernetic Patent, "Underground Emotional Mapping," http://realtimecities.wikispaces.com/file/view/Patent_Nikola+Bojic.pdf, 2011, 2 pages.

Newsbiez, "This Toyota Car Driver Confusion Detection," http://newsbiez.blogspot.com/2012/04/this-toyota-car-driver-confusion.html, Apr. 2012, 2 pages.

The New Zealand Herald, "Crash Blamed on Road Confusion," http://www.nzherald.co.nz/nz/news/article.cfm?c_id=1&objectid=10787517, Feb. 2012, 1 page Heather Clark, "Biofeedback Devices Help Find Some of the Most Soothing Places on Earth," Locative Media in the Wild, Spiritual Geocaching, digitalarts.ucsd.edu/~wild/clark/, 2007, 6 pages.

* cited by examiner

SYSTEM AND METHOD FOR PROVIDING GLOBAL POSITIONING SYSTEM (GPS) FEEDBACK TO A USER

TECHNICAL FIELD

The field generally relates to systems and methods for providing global positioning system (GPS) feedback to a user and, in particular, systems and methods which analyze a route and a driver's emotional state to provide personalized feedback.

BACKGROUND

GPS vehicle navigation systems provide directional information for a typical or "default" driver, assuming typical or "default" road conditions or scenarios. This lack of personalization or route detail can lead GPS systems to provide excess and sometimes irritating information to a driver when the information is not needed or wanted, or to not provide needed or wanted information when such extra information may be helpful. For example, known GPS systems may advise a driver to continue in a straight path when it is clear that there are no options for turning at a particular point along a route. Conversely, known GPS systems may fail to provide extra warnings to a driver when a route has multiple intersections in close proximity to each other, and is potentially confusing to a driver.

When known GPS vehicle navigation systems provide directions, a driver often must double and triple check the GPS display to see if a turn should be made. The known GPS systems would be more useful and effective if the systems can use additional knowledge about the potential confusability of particular roads, and about a comfort level of the driver to provide worthwhile feedback to the driver when needed.

SUMMARY

In general, exemplary embodiments of the invention include systems and methods for providing global positioning system (GPS) feedback to a user and, in particular, systems and methods which analyze a route and a driver's emotional state to provide personalized feedback.

According to an exemplary embodiment of the present invention, a system for providing global positioning system (GPS) feedback to a user, comprises an evaluation module capable of evaluating a route of the user to determine potential points of confusion, a collection module capable of collecting at least one of behavioral information and physiological information from the user, an analysis module capable of analyzing the collected information to determine a level of user confusion at a point on the route and whether the level of the user confusion exceeds a threshold, and a feedback module capable of providing the user with clarifying feedback upon at least one of a determination of a potential point of confusion and the level of the user confusion exceeding the threshold.

According to an exemplary embodiment of the present invention, a method for providing global positioning system (GPS) feedback to a user, comprises evaluating a route of the user to determine potential points of confusion, collecting at least one of behavioral information and physiological information from the user, analyzing the collected information to determine a level of user confusion at a point on the route and whether the level of the user confusion exceeds a threshold, and providing the user with clarifying feedback upon at least one of a determination of a potential point of confusion and the level of the user confusion exceeding the threshold.

According to an exemplary embodiment of the present invention, an article of manufacture comprises a computer readable storage medium comprising program code tangibly embodied thereon, which when executed by a computer, performs method steps for providing global positioning system (GPS) feedback to a user, the method steps comprising evaluating a route of the user to determine potential points of confusion, collecting at least one of behavioral information and physiological information from the user, analyzing the collected information to determine a level of user confusion at a point on the route and whether the level of the user confusion exceeds a threshold, and providing the user with clarifying feedback upon at least one of a determination of a potential point of confusion and the level of the user confusion exceeding the threshold.

According to an exemplary embodiment of the present invention, an apparatus for providing global positioning system (GPS) feedback to a user, comprises a memory, and a processor coupled to the memory and configured to execute code stored in the memory for evaluating a route of the user to determine potential points of confusion, collecting at least one of behavioral information and physiological information from the user, analyzing the collected information to determine a level of user confusion at a point on the route and whether the level of the user confusion exceeds a threshold, and providing the user with clarifying feedback upon at least one of a determination of a potential point of confusion and the level of the user confusion exceeding the threshold.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Figure 1:
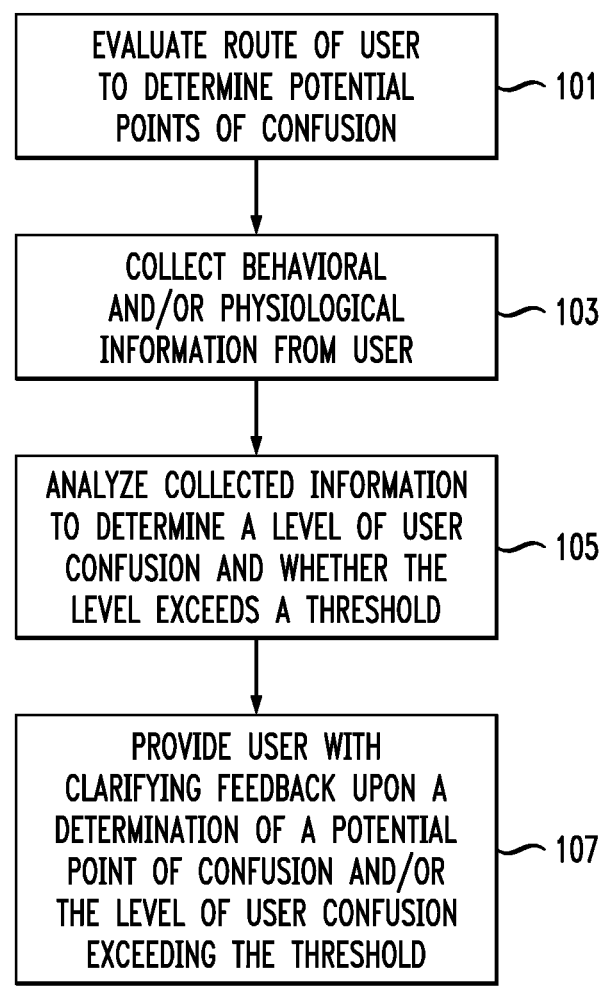
FIG. 1 is a flow diagram of a method for providing global positioning system (GPS) feedback to a user according to an exemplary embodiment of the invention.

Exemplary embodiments of the invention will now be discussed in further detail with regard to systems and methods for providing global positioning system (GPS) feedback to a user and, in particular, systems and methods which analyze a route and a driver's emotional state to provide personalized feedback. This invention may, however, be embodied in many different forms and should not be construed as limited to the embodiments set forth herein.

Embodiments of the present invention include systems and methods which provide GPS instruction that is more sensitive to the conditions of the road than known systems, and which capture various multimodal signals from a user, for example, the driver, to determine whether the user is unsure or confused about the directions the GPS is providing (e.g., if a turn should be made or not). GPS systems, in accordance with embodiments of the present invention, sense uncertainty from the users and provide feedback to the users telling them how they should proceed with the directions. It is to be understood that the GPS systems can be utilized for a variety of vehicles, including but not limited to, cars, trucks, motorcycles and buses.

In accordance with embodiments of the present invention, a context-aware GPS system identifies areas that are potentially confusing (e.g., an area where there are 2 or more right-hand turn options in close proximity). In the event that a particular juncture on a route is identified as a potential source of confusion, additional information will be provided to the user. For example, a system in accordance with an embodiment of the present invention can point out that there are two or more right-hand turns in close proximity, and explicitly and clearly warn the user that he/she should ignore the first turn and take the second.

Embodiments of the present invention also identify potential areas of confusion using historical information of how other vehicles moved in an area. For example, the historical information can include a record of several vehicles that passed a turn and then returned to it and/or comments (e.g., oral or written) from users commenting on their satisfaction or dissatisfaction with the navigation instructions at parts of a road.

A personalized GPS feedback system, in accordance with an embodiment of the present invention, collects various multimodal measurements from the user. These measurements include biometric information (e.g., pulse rate, hand temperature), visual cues (e.g., facial expressions, body movements) and spoken cues. Measurements can include, for example, physiological and behavioral characteristics including, but not limited to, an individual's voice, movements, gestures, expressions, posture, etc. When in a vehicle, embodiments of the present invention use information such as movements on the vehicle seats, pressure, temperature and humidity levels on the steering wheel or armrests, galvanic skin response, facial expressions, gestures, voice levels/characteristics, etc., to determine whether a user, such as the driver, is in a state of uncertainty or confusion. Alternatively or in addition, measurements can be taken from a passenger in the vehicle in the same or similar manner to those taken from a driver to also determine uncertainty or confusion on the part of the passenger.

By way of example, elevated pulse rate and elevated body temperature could indicate uncertainty and/or anxiety in the user. Uncertainty or anxiety can also be manifested by a person's facial expressions, eye/head movements that keep looking at a GPS display, body language (e.g., throwing up one's hands in frustration) and spoken cues indicating, for example, "I am confused", "I don't know where to turn", etc.

According to an embodiment, various biometric sensors are placed around the user(s) to measure quantities including, but not limited to, voice level, pulse rate, hand temperature, facial expressions (e.g., concerned, furrowed brow), skin conductance and body movements. Sensors may include, but are not limited to, pressure, motion, pulse rate, skin conductance and/or temperature sensors, located, for example, on the steering wheel, seat and/or any other surface in the vehicle, microphones and video and/or still image cameras located, for example, in or on the dashboard, visor, rearview mirror, window, radio and/or at a user's feet.

According to an embodiment, a training phase can be implemented where the system learns how a user manifests confusion or uncertainty under various biometric measurements, by using, for example, a machine learning algorithm. Such measurements in a training phase can be taken in a vehicle, or in settings outside of the vehicle, such as, for example, at one's desk in an office or at home in front of one's computer. In accordance with an embodiment of the present invention, data concerning how a particular user exhibits confusion/uncertainty can be input to a machine learning algorithm as labels and processed using pattern recognition techniques. The data analyzed according to the machine learning algorithm during the training phase may include, but is not limited to, data from one or more sensors, cameras and microphones, previously analyzed or categorized data results, and environment data. In accordance with an embodiment of the present invention, models and history data for analysis by, for example, a statistical filter can be developed during the training phase. It is also contemplated that training can be supervised requiring an explicit indication of confusion to determine those actions by a user that indicate confusion, or unsupervised, allowing the system to determine when a user is exhibiting behavior associated with being confused or uncertain. According to an embodiment, once learning is completed, the system incorporates the determinations when detecting confusion/uncertainty of a user.

Systems and methods in accordance with embodiments of the present invention measure and weight each signal in connection with user actions to determine whether a user is confused and/or uncertain. If it is determined that the user is uncertain/confused, the system will provide feedback to the user in an effort to eradicate the confusion/uncertainty (e.g., inform the user/driver to "keep going straight" or "turn at the next light").

Embodiments of the present invention may also factor in historical information of other users emotional states recorded at the same points along a road or route that a current user is traveling. Common elements in user behavior at certain locations may point to common difficulties for different users to orient themselves in a given environment given instructions from GPS systems. Accordingly, this historical information can be useful when interpreting user reactions.

Referring to FIG. 1, a flow diagram of a method for providing global positioning system (GPS) feedback to a user, according to an embodiment of the present invention, is shown. The method 100 includes evaluating a route of the user to determine potential points of confusion (block 101). The evaluating may include analyzing the route to determine a number of possible driving maneuvers at a given juncture on the route. For example, there may be multiple turns in a same direction at intersections in close proximity to each other so that a driver may become confused regarding at which intersection to turn when give an instruction to turn. If, for example, there is greater than one possible maneuver in a close area, the system may conclude a potential point of confusion.

Evaluating can also include determining adequacy of street signage at a given juncture on the route. In accordance with embodiments of the present invention, data on poor street signage or a lack thereof can be gathered from sources and stored in an accessible database to be used when evaluating potential points of confusion. The sources for street sign data can include, but are not limited to, user input based on observations of poor, deficient and/or confusing signage provided via, for example, social media and/or navigation applications on portable electronic devices, such as dedicated navigation devices, smartphones or personal digital assistants (PDAs) and traffic department records.

In accordance with an embodiment of the present invention, the evaluation process can also factor in historical information on how users drove their vehicles on the route and/or prior users' levels of confusion along different points on the route. For example, prior drivers may have missed the same turn that is to be flagged as a potential point of confusion, and may have exhibited uncertainty and/or confusion at the potential points of confusion. This historical information can be obtained by user feedback through navigation applications and/or social media, previous tracking of vehicles' movements along the same or similar route and/or previous monitoring of user behavior and physiology. The historical information, which can be stored in an accessible database, can be weighed and, for example, increase a likelihood of a determination that an area is a potential point of confusion if previous drivers were confused or mistakes in following the route were made.

At block 103, the method further includes collecting behavioral information and/or physiological information from the user. As mentioned above, the collected information can include, for example, pulse rate, body temperature, body movements, facial expressions, skin conductance, and/or voice cues of the user, and can be collected by a variety of sensors and/or devices strategically placed in a vehicle.

At block 105, the method includes analyzing the collected information to determine a level of user confusion at a point on the route and whether the level of the user confusion exceeds a threshold. The threshold can be based on, for example, whether the pulse rate, body temperature, skin conductance, voice levels, etc. exceed certain predetermined levels where anxiety and/or confusion might be concluded. In accordance with an embodiment, determining whether a threshold is exceeded can also include aggregating, weighting and quantifying observations such as facial expressions, body and eye movements and voice cues to assign numerical values to these observations which can be compared to a threshold. Alternatively, or in addition, certain types of behavior or combinations of types of behavior, such as, for example, explicit declarations of confusion and/or repeatedly referring to a GPS display can lead to a direct determination of user confusion and/or exceeding of the threshold.

In accordance with an embodiment of the present invention, the threshold can be altered based on, for example, an age of the user and/or an amount of time that the user has been a licensed driver. For example, the confusion threshold can be lowered for a younger driver or an older driver in a higher risk age range, and/or for a driver having less than average driving experience. Conversely, the confusion threshold can be elevated for drivers in a low risk age category and/or for drivers having more than average driving experience. The categories for altering a threshold can be weighted.

At block 107, upon a determination of a potential point of confusion and/or the level of the user confusion exceeding the threshold, the user is provided with clarifying feedback in an effort to eradicate the confusion. The clarifying feedback can include, for example, audio disambiguation, visual disambiguation and/or vibratory disambiguation. The audio disambiguation may comprise additional verbiage beyond an original navigation instruction to advise the user how to proceed at a particular point of confusion. For example, more explicit instructions on when and where to turn, citing landmarks, and/or more detail (e.g., turn at first corner, not at second) can be provided. The visual disambiguation can comprise, for example, enhanced brightness, magnification or flashing to highlight how to proceed on a visual display depicting the intended route. The vibratory disambiguation can comprise, for example, a vibratory stimulation (e.g., on the steering wheel) at or near a particular point of confusion to advise the user how to proceed.

In accordance with embodiments of the present invention, the method can further comprise evaluating the route of the user to identify straightforward portions of the route and eliminating and/or reducing planned instructions at the identified straightforward portions. Straightforward portions can be, for example, stretches of road that do not contain any intersections or turning options where unnecessary or superfluous instructions to proceed along the route can be eliminated.

In accordance with an embodiment of the present invention, upon determining that the level of the user confusion exceeds the threshold, a driver within a predetermined area of the user (e.g., a radius of about 1000 feet or less) can be notified of the user confusion via, for example, a navigation application, email and/or text message transmitted through the vehicle. As result, drivers near the confused user can prepare for unexpected, frustrating or potentially dangerous movements that might be made by a confused motorist.

Figure 2:
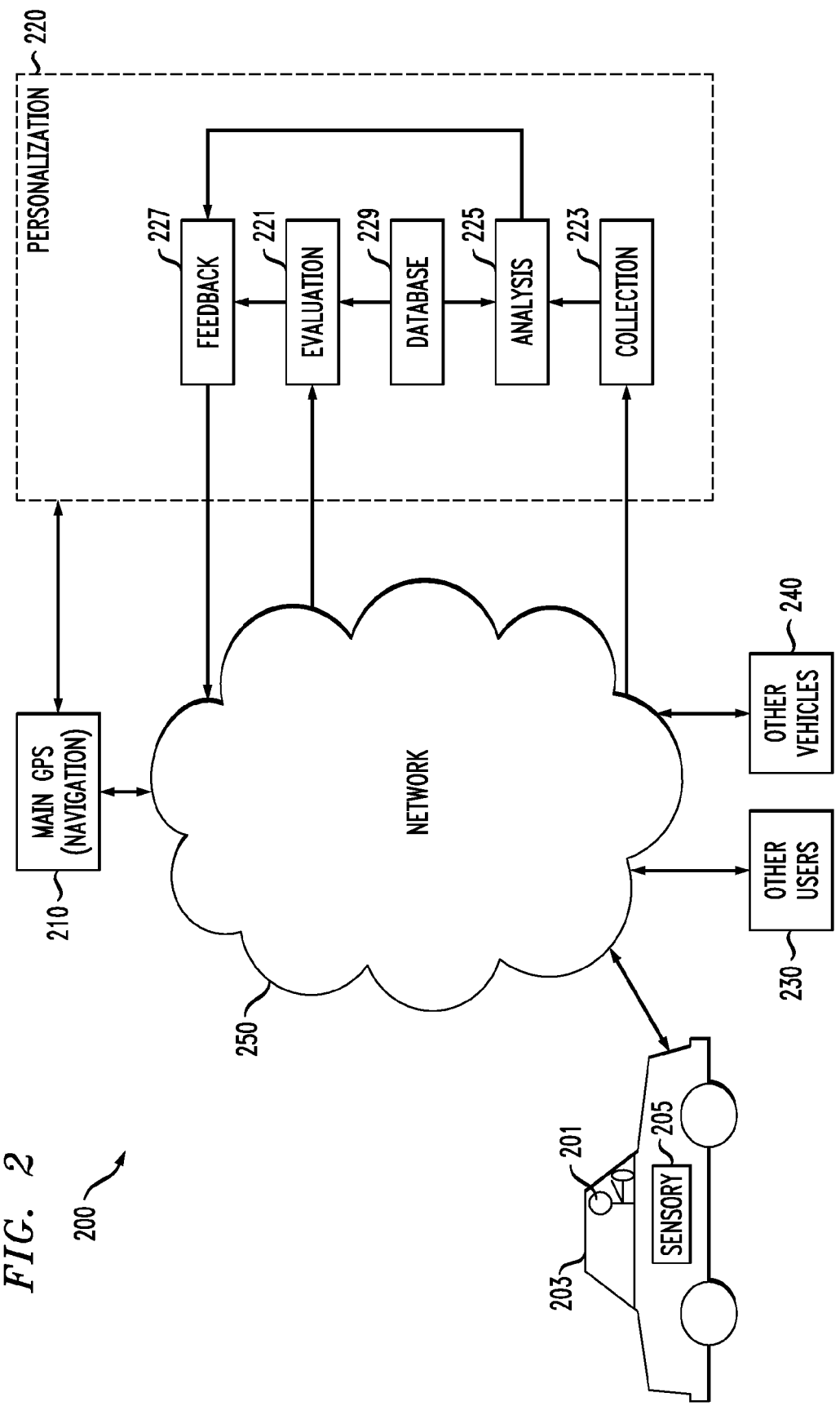
FIG. 2 is high-level diagram showing detail of a system for providing global positioning system (GPS) feedback to a user according to an exemplary embodiment of the invention.

Referring to FIG. 2, a high-level diagram of a system for providing global positioning system (GPS) feedback to a user, according to an embodiment of the present invention, is shown. The system 200 includes a user 201 in a vehicle 203, wherein the user 201 via an electronic device, such as a dedicated GPS device, smartphone, tablet, laptop or personal digital assistant (PDA) is connected to a network 250. In addition, the vehicle 203, which includes behavioral and physiological sensory equipment 205, such as, for example, biometric sensors, cameras, microphones, etc. described above, and which may include a GPS device, is connected to the network 250. The network 250 can include, for example, one or more of a wireless LAN (WLAN), wide area network (WAN), cellular network, satellite network and the Internet. A main GPS module 210 essentially representing a conventional GPS module providing the general navigation and route guidance is connected to the network 250. A personalization module 220, which includes an evaluation module 221, a collection module 223, an analysis module 225, a feedback module 227 and a database 229, is connected to the main GPS module 210. According to embodiments, the personalization module 220 can be integrated into the main GPS module 210 or connected to the GPS module 210 outside of the main GPS module 210, for example, as an add-on to the main GPS module 210. The personalization module 220, and the components thereof (221, 223, 225, 227 and 229) can be connected to the network via the main GPS module 210 or independent of the main GPS module 210.

The evaluation module 221 evaluates a route of the user (e.g., received via the network 250 and/or the main GPS module 210) to determine the potential points of confusion. In accordance with embodiments of the present invention, the evaluation module 221 can rely on data on poor street signage or a lack thereof gathered from sources and stored in the accessible database 229 to be used when evaluating potential points of confusion. As stated above in connection with FIG. 1, the sources for street sign data can include, but are not limited to, user input from other users 230 based on their observations of poor, deficient or confusing signage and traffic department records retrieved via the network 250. Similarly, the historical information used during the evaluation process can be obtained by feedback from other users 230, previous tracking of movements of other vehicles 240 along the same or similar route and/or previous monitoring of user behavior and physiology retrieved via the network 250 stored in the accessible database 229.

The collection module 223 collects behavioral information and/or physiological information from the user 201 gathered using the sensory equipment 205. As mentioned above, the collected information can include, for example, pulse rate, body temperature, body movements, facial expressions, skin conductance, and/or voice cues of the user, and can be collected by the sensory equipment 205 strategically placed in a vehicle 203.

The analysis module 225 analyzes the collected information to determine the level of user confusion at a point on the route and whether the level of the user confusion exceeds a threshold. In accordance with an embodiment, the analysis module 225 can determine whether a threshold is exceeded by aggregating, weighting and quantifying observations such as facial expressions, body and eye movements and voice cues to assign numerical values to these observations which can be compared to a threshold. Alternatively, or in addition, certain types of behavior or combinations of types of behavior, such as, for example, explicit declarations of confusion and/or repeatedly referring to a GPS display can lead to a direct determination by the analysis module 225 of user confusion and/or exceeding of the threshold. In accordance with an embodiment of the present invention, the analysis module 225 alters threshold based on, for example, an age of the user and/or an amount of time that the user has been a licensed driver.

Upon a determination of a potential point of confusion by the evaluation module 221 and/or the level of the user confusion exceeding the threshold by the analysis module 225, the feedback module 227 provides the user 201 with clarifying feedback in an effort to eradicate the confusion. The feedback can be provided through the main GPS module 210 and the network 250 or directly via the network 250 to the user 201 in the vehicle 203.

In accordance with embodiments of the present invention, the evaluation module 221 can further evaluate the route of the user to identify straightforward portions of the route and eliminate and/or reducing planned instructions at the identified straightforward portions via the feedback module 227.

In accordance with an embodiment of the present invention, upon determining that the level of the user confusion exceeds the threshold by the analysis module 225, other drivers 230 and other vehicles 240 within a predetermined area of the user 201 can be notified of the user confusion through the feedback module 227 and via the network 250.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 1 and 2 illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 3:
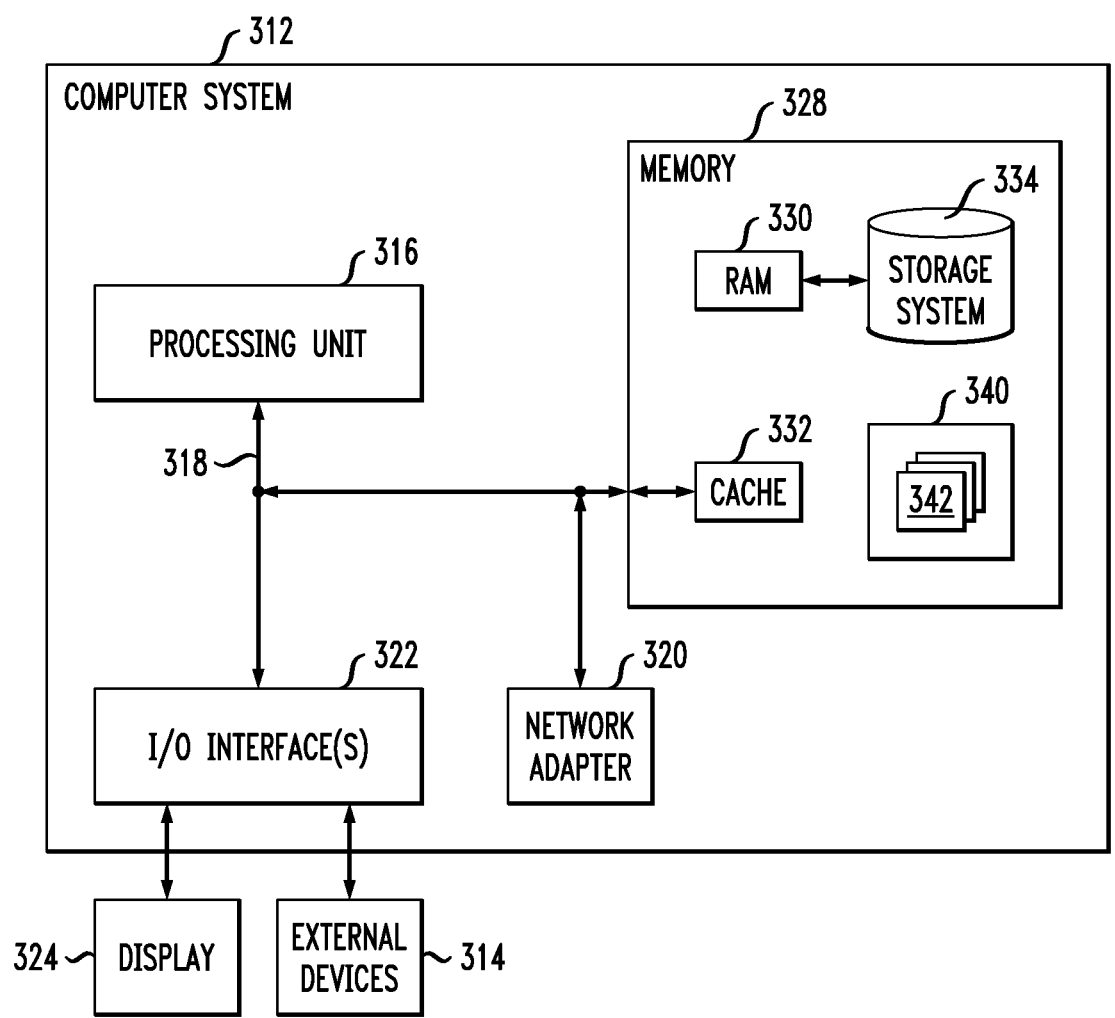
FIG. 3 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 3, in a computing node 310 there is a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in computing node 310 is shown in the form of a general-purpose computing device. The components of computer system/server 312 may include, but are not limited to, one or more processors or processing units 316, a system memory 328, and a bus 318 that couples various system components including system memory 328 to processor 316.

The bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 312 typically includes a variety of computer system readable media. Such media may be any available media that is accessible by computer system/server 312, and it includes both volatile and non-volatile media, removable and non-removable media.

The system memory 328 can include computer system readable media in the form of volatile memory, such as random access memory (RAM) 330 and/or cache memory 332. The computer system/server 312 may further include other removable/non-removable, volatile/nonvolatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 318 by one or more data media interfaces. As depicted and described herein, the memory 328 may include at least one program product having a set (e.g., at least one) of program modules that are configured to carry out the functions of embodiments of the invention. A program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

Computer system/server 312 may also communicate with one or more external devices 314 such as a keyboard, a pointing device, a display 324, etc., one or more devices that enable a user to interact with computer system/server 312, and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A system for providing global position system (GPS) feedback to a user in a first vehicle, comprising:

an evaluation module capable of evaluating a route of the user received from a GPS via a network to determine potential points of confusion;

a collection module capable of collecting at least one of behavioral information and physiological information from the user utilizing at least one sensor placed around the user;

an analysis module capable of analyzing the collected information to determine a level of user confusion at a point on the route, comparing the level of user confusion to a threshold, and determining whether the level of the user confusion exceeds the threshold; and a feedback module capable of providing the user with clarifying feedback upon determination of a potential point of confusion and the level of the user confusion exceeding the threshold;

wherein the feedback module is further capable of notifying a driver of a second vehicle, within a predetermined area of the user, of the user confusion upon the determination that the level of the user confusion exceeds the threshold;

wherein the system implements a training phase to learn how the user manifests the user confusion;

wherein the training phase comprises the system learning how the user manifests the user confusion while the user is in a setting outside of the first vehicle; and wherein the analysis module is further capable of automatically concluding, without performing the comparing, that the level of the user confusion exceeds the threshold upon the user making at least one of an explicit declaration of confusion and repeated reference to a GPS display.

2. The system according to claim 1, wherein the evaluation module performs the evaluating by determining a number of possible driving maneuvers at a given juncture on the route.

3. The system according to claim 1, wherein the evaluation module performs the evaluating by determining adequacy of street signage at a given juncture on the route.

4. The system according to claim 1, wherein the evaluation module performs the evaluating by factoring in historical information on how users drove their vehicles on the route.

5. The system according to claim 1, wherein the evaluation module performs the evaluating by factoring in historical information on users' levels of confusion on the route.

6. The system according to claim 1, wherein the clarifying feedback comprises at least one of audio disambiguation, visual disambiguation and vibratory disambiguation.

7. The system according to claim 1, wherein the evaluation module is further capable of evaluating the route of the user to identify a straightforward portion of the route and the feedback module is further capable of at least one of eliminating or reducing a planned instruction at the identified straightforward portion.

8. The system according to claim 1, wherein the collected information comprises at least one of pulse rate, a body temperature, a body movement, a facial expression, a skin conductance, and a voice cue of the user.

9. The system according to claim 1, wherein the analysis module is further capable of altering the threshold based on at least one of an age of the user and an amount of time that the user has been a licensed driver.

10. The system according to claim 1, wherein determining whether the level of the user confusion exceeds the threshold comprises aggregating, weighting and quantifying elements of the collected information to assign numerical values to the elements of the collected information.

11. A method for providing global positioning system (GPS) feedback to a user in a first vehicle, the method comprising:
evaluating a route of the user received from a GPS via a network to determine potential points of confusion;
collecting at least one of behavioral information and physiological information from the user utilizing at least one sensor placed around the user;
analyzing the collected information to determine a level of user confusion at a point on the route:
comparing the level of user confusion to a threshold;
determining whether the level of the user confusion exceeds the threshold;
providing the user with clarifying feedback upon determination of a potential point of confusion and the level of the user confusion exceeding the threshold;
notifying a driver of a second vehicle, within a predetermined area of the user, of the user confusion upon the determination that the level of the user confusion exceeds the threshold;
implementing a training phase to learn how the user manifests the user confusion; and
automatically concluding, without performing the comparing, that the level of the user confusion exceeds the threshold upon the user making at least one of an explicit declaration of confusion and repeated reference to a GPS display;
wherein the training phase comprises learning how the user manifests the user confusion while the user is in a setting outside of the first vehicle.

12. The method according to claim 11, wherein evaluating comprises determining a number of possible driving maneuvers at a given juncture on the route.

13. The method according to claim 11, wherein evaluating comprises determining adequacy of street signage at a given juncture on the route.

14. The method according to claim 11, wherein evaluating comprises factoring in historical information on how users drove their vehicles on the route.

15. The method according to claim 11, wherein evaluating comprises factoring in historical information on users' levels of confusion on the route.

16. The method according to claim 11, wherein the clarifying feedback comprises at least one of audio disambiguation, visual disambiguation and vibratory disambiguation.

17. The method according to claim 11, further comprising evaluating the route of the user to identify a straightforward portion of the route and at least one of eliminating or reducing a planned instruction at the identified straightforward portion.

18. The method according to 11, wherein the collected information comprises at least one of pulse rate, a body temperature, a body movement, a facial expression, a skin conductance, and a voice cue of the user.

19. The method according to claim 11, further comprising altering the threshold based on at least one of an age of the user and an amount of time that the user has been a licensed driver.

20. An article of manufacture comprising a computer readable storage medium comprising program code tangibly embodied thereon, which when executed by a computer, performs method steps for providing global positioning system (GPS) feedback to a user in a first vehicle, the method steps comprising:
evaluating a route of the user received from a GPS via a network to determine potential points of confusion;

collecting at least one of behavioral information and physiological information from the user utilizing at least one sensor placed around the user;
analyzing the collected information to determine a level of user confusion at a point on the route:
comparing the level of user confusion to a threshold;
determining whether the level of the user confusion exceeds the threshold;
providing the user with clarifying feedback upon determination of a potential point of confusion and the level of the user confusion exceeding the threshold;
notifying a driver of a second vehicle, within a predetermined area of the user, of the user confusion upon the determination that the level of the user confusion exceeds the threshold;
implementing a training phase to learn how the user manifests the user confusion; and
automatically concluding, without performing the comparing, that the level of the user confusion exceeds the threshold upon the user making at least one of an explicit declaration of confusion and repeated reference to a GPS display;
wherein the training phase comprises learning how the user manifests the user confusion while the user is in a setting outside of the first vehicle.

21. An apparatus for providing global positioning system (GPS) feedback to a user in a first vehicle, comprising:
a memory; and
a processor coupled to the memory and configured to execute code stored in the memory for:
evaluating a route of the user received from a GPS via a network to determine potential points of confusion;
collecting at least one of behavioral information and physiological information from the user utilizing at least one sensor placed around the user;
analyzing the collected information to determine a level of user confusion at a point on the route:
comparing the level of user confusion to a threshold;
determining whether the level of the user confusion exceeds the threshold;
providing the user with clarifying feedback upon determination of a potential point of confusion and the level of the user confusion exceeding the threshold; and
notifying a driver of a second vehicle, within a predetermined area of the user, of the user confusion upon the determination that the level of the user confusion exceeds the threshold;
implementing a training phase to learn how the user manifests the user confusion; and
automatically concluding, without performing the comparing, that the level of the user confusion exceeds the threshold upon the user making at least one of an explicit declaration of confusion and repeated reference to a GPS display;
wherein the training phase comprises learning how the user manifests the user confusion while the user is in a setting outside of the first vehicle.

* * * * *